United States Patent
Dow et al.

(10) Patent No.: US 10,169,670 B2
(45) Date of Patent: Jan. 1, 2019

(54) STROKE EXTRACTION IN FREE SPACE

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/953,713

(22) Filed: Nov. 30, 2015

(65) Prior Publication Data

US 2017/0154230 A1    Jun. 1, 2017

(51) Int. Cl.
*G06K 9/00* (2006.01)
*G06F 17/22* (2006.01)
*G06F 3/01* (2006.01)

(52) U.S. Cl.
CPC ......... *G06K 9/00879* (2013.01); *G06F 3/017* (2013.01); *G06F 17/2217* (2013.01); *G06K 9/00422* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 7,474,771 B2 | 1/2009 | Bang et al. | |
| 8,022,928 B2 | 9/2011 | Ye | |
| 9,261,979 B2 * | 2/2016 | Shamaie | G06F 3/017 |
| 2009/0051648 A1 * | 2/2009 | Shamaie | G06F 3/0346 345/156 |
| 2009/0052785 A1 * | 2/2009 | Shamaie | G06F 3/017 382/209 |

(Continued)

FOREIGN PATENT DOCUMENTS

| | | |
|---|---|---|
| JP | 09237321 A | 9/1997 |
| WO | 9910834 A1 | 3/1999 |

(Continued)

OTHER PUBLICATIONS

Cuccioli et al., "Neural Network OCR", May 3, 2014, pp. 1-3, <https://github.com/bcuccioli/neural-ocr>.

(Continued)

*Primary Examiner* — Bernard Krasnic
(74) *Attorney, Agent, or Firm* — Andrew Aubert; Alexander G. Jochym; Maeve L. Carpenter

(57) ABSTRACT

An approach for stroke extraction in free space utilizing a paired ring device is provided. The approach receives one or more images transmitted from the paired ring device, wherein the one or more images are transcribed sequentially from data related to one or more movements recorded by the paired ring device, and wherein the one or more images include one or more of a plurality of vector points, a plurality of coordinates, and a plurality of dots interconnected by a plurality of lines. The approach inputs the one or more images into a character training model. The approach maps the one or more images into one or more characters. The approach transcribes the one or more characters into a digital document.

20 Claims, 3 Drawing Sheets

(56) References Cited

U.S. PATENT DOCUMENTS

| | | | |
|---|---|---|---|
| 2009/0303204 A1* | 12/2009 | Nasiri | A63F 13/06 345/184 |
| 2012/0020566 A1 | 1/2012 | Yamanouchi | |
| 2013/0171490 A1 | 7/2013 | Rothkopf et al. | |
| 2013/0300675 A1* | 11/2013 | Tsutsui | G06F 3/04883 345/173 |
| 2015/0205765 A1* | 7/2015 | Wu | G06F 17/214 715/269 |
| 2015/0278658 A1* | 10/2015 | Hara | G06K 15/1827 358/1.9 |
| 2016/0203360 A1* | 7/2016 | Alvarez | G06K 9/00355 345/156 |

FOREIGN PATENT DOCUMENTS

| | | |
|---|---|---|
| WO | 2009042949 A1 | 4/2009 |
| WO | 2009126176 A1 | 10/2009 |

OTHER PUBLICATIONS

Hu et al., "HMM Based On-Line Handwriting Recognition", IEEE Transactions on Pattern Analysis and Machine Intelligence, vol. 18, No. 10, Oct. 1996, © 1996 IEEE, pp. 1039-1045.

Mathas, Carolyn, "Smallest six-axis gyroscope/accelerometer cuts size by 45%", EE Times, Jul. 11, 2012, pp. 1-4, <http://www.eetimes.com/document.asp?doc_id=1317349>.

Derry, Douglas, "First Fully Functional Flexible Memory Unveiled", Tom's Hardware, Nov. 4, 2011, pp. 1-3, <http://www.tomshardware.com/news/flexible-memory-science-research-rram,13892.html>.

Software Patent Institue et al., "Applications and Problems of Optical Character Recognition", An IP.com Prior Art Database Technical Disclosure, Original Publication Date: Mar. 31, 1972, IP.com No. 000151578, IP.com Electronic Publication: Apr. 23, 2007, Database entry Copyright (c) Software Patent Institute, pp. 1-20.

Software Patent Institue et al.,"Discriminant Grammars for Pattern Classification", An IP.com Prior Art Database Technical Disclosure, Original Publication Date: Dec. 31, 1976, IP.com No. 000148958, IP.com Electronic Publication: Mar. 30, 2007, Database entry Copyright (c) Software Patent Institute, pp. 1-105.

Software Patent Institue et al., "On-Line Character Recognition", An IP.com Prior Art Database Technical Disclosure, Original Publication Date: Dec. 30, 1899, IP.com No. 000151307, IP.com Electronic Publication: Apr. 22, 2007, Database entry Copyright (c) Software Patent Institute, pp. 1-41.

"iMotion—Haptic feedback virtual reality motion control", Printed on Jul. 14, 2015, <https://www.kickstarter.com/projects/576456616/imotion-3d-motion-controller-with-haptic-feedback>.

"Kapton", From Wikipedia, the free encyclopedia, This page was last modified on May 28, 2015, printed on Jul. 13, 2015, pp. 1-3, <https://en.wikipedia.org/wiki/Kapton>.

"Murata Commences Mass Production of World's Smallest Bluetooth® Modules in its "LBMA Series"; Cumulative "LBMA Series" Production Passes 500 Million Mark", Mar. 31, 2010, Murata Manufacturing Co., Ltd., pp. 1-2, <http://www.murata.com/about/newsroom/news/product/frontend/2010/0331>.

"ocr4j—optical character recognition, Java library", printed on Jul. 13, 2015, 1 page, <http://ocr4j.sourceforge.net/>.

"Shrunk down an Arduino to the size of a fingertip!", Kickstarter, Open Source RF, pp. 1-22, <https://www.kickstarter.com/projects/1608192864/rfduino-iphone-bluetooth-40-arduino-compatible-boa>, Printed on Jul. 13, 2015.

* cited by examiner

STROKE EXTRACTION IN FREE SPACE

BACKGROUND OF THE INVENTION

The present invention relates generally to writing recognition, and more particularly to capturing handwriting using a ring device.

Handwriting recognition is the ability of a computer to receive and interpret intelligible handwritten input from sources such as paper documents, photographs, touchscreens and other devices. The image of the written text may be sensed "off line" from a piece of paper by optical scanning (optical character recognition) or intelligent word recognition. Alternatively, the movements of the pen tip may be sensed "on line", for example by a pen-based computer screen surface.

Handwriting recognition principally entails optical character recognition. However, a complete handwriting recognition system also handles formatting, performs correct segmentation into characters and finds the most plausible words.

SUMMARY

Aspects of an embodiment of the present invention disclose a method, system, and computer program product for stroke extraction in free space utilizing a paired ring device. The method includes receiving, by one or more computer processors, one or more images transmitted from the paired ring device, wherein the one or more images are transcribed sequentially from data related to one or more movements recorded by the paired ring device, and wherein the one or more images include one or more of a plurality of vector points, a plurality of coordinates, and a plurality of dots interconnected by a plurality of lines. The method includes inputting, by one or more computer processors, the one or more images into a character training model. The method includes mapping, by one or more computer processors, the one or more images into one or more characters. The method includes transcribing, by one or more computer processors, the one or more characters into a digital document.

DETAILED DESCRIPTION

Embodiments of the present invention provide the capability to perform stroke extraction in free space utilizing a ring device worn on the user's hand. Embodiments of the present invention further provide the capability to pair the ring device to a computing device, such that the computing device receives input from the ring device and, utilizing a training model, digitally transcribes characters written by the user.

Implementation of such embodiments may take a variety of forms, and exemplary implementation details are discussed subsequently with reference to the Figures.

Figure 1:
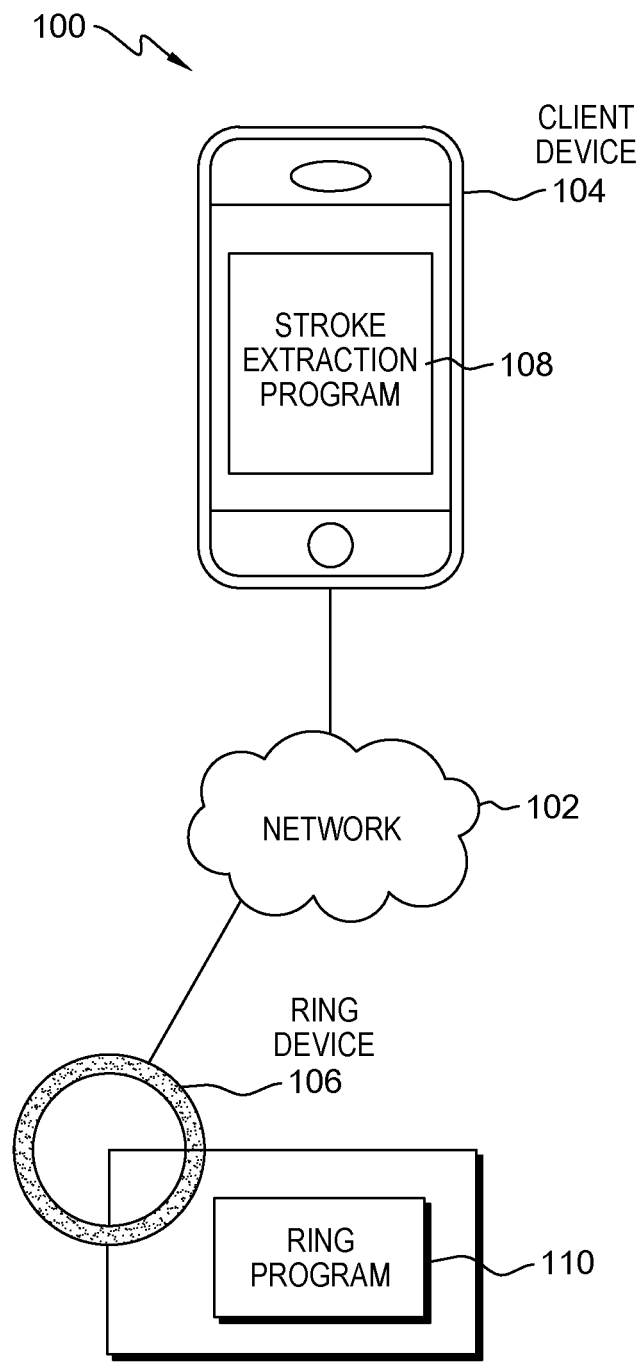
FIG. 1 illustrates a functional block diagram depicting a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes a network 102, a client device 104, and a ring device 106.

In one embodiment, network 102 is the Internet representing a worldwide collection of networks and gateways that use TCP/IP protocols to communicate with one another. Network 102 may include wire cables, wireless communication links, fiber optic cables, routers, switches, and/or firewalls. Network 102 can be any combination of connections and protocols capable of supporting communications between client device 104 and ring device 106. In another embodiment, network 102 can be any combination of connections and protocols capable of supporting communications between ring device 106 and one or more mobile devices, networks, and electronic devices or computing systems (not shown) capable of sending and receiving data through network 102. In one embodiment, network 102 can be any combination of connections and protocols capable of supporting communications between client device 104, ring device 106, stroke extraction program 108, and ring program 110. Network 102 may also be implemented as a number of different types of networks, such as an intranet, a local area network (LAN), a virtual local area network (VLAN), or a wide area network (WAN). Network 102 may include wire cables, wireless communication links, fiber optic cables, routers, switches, and/or firewalls.

In one embodiment, client device 104 may be, for example, a desktop computer, a laptop computer, a tablet computer, a personal digital assistant (PDA), a smart phone, a thin client, or any other electronic device or computing system capable of communicating with ring device 106 through network 102. For example, client device 104 may be a mobile device capable of connecting to a network, such as network 102, to communicate with a ring device, such as ring device 106, to utilize one or more software-based programs, such as stroke extraction program 108 and ring program 110. In one embodiment, client device 104 may be any suitable type of mobile device capable of running mobile applications, including a smart phone, tablet, slate, or any type of device that runs a mobile operating system. In one embodiment, client device 104 may be capable of communicating wirelessly with ring device 106. In one embodiment, client device 104 provides the capability to receive a user's hand, arm, wrist, and finger movements from a paired device, such as ring device 106, and utilizing the user's movements along with a training model, output characters being written by the user, such that they are digitally transcribed on a display fully integrated with, partially integrated with, or separate from client device 104.

In another embodiment, client device 104 can be any wearable electronic device, including, without limitation, wearable electronic devices affixed to eyeglasses and sunglasses, helmets, wristwatches, clothing, wigs, and the like, capable of sending, receiving, and processing data. For example, client device 104 may be a wearable electronic device, such as a wristwatch, an article of clothing, or augmented reality glasses, capable of receiving data captured from a ring device, such as ring device 106, related to a user's handwriting movement, such as a plurality of accelerometer data of the user's hand movements, and transcribed coordinates and images related to the plurality of accelerometer data. In another embodiment, client device 104 may be a wearable electronic device, such as eyeglasses with an integrated heads up display (HUD), capable of receiving data captured from a ring device, such as ring device 106, related to a user's handwriting movement, and transcribe the data as a visual augmentation of characters for user consumption.

In one embodiment, ring device 106 may be a conventional ring shaped device, where the conventional ring shaped device may be circular, oval, square, or any other geometric shape capable of fitting over at least one of a user's digits (i.e., fingers and thumbs). In one embodiment, ring device 106 may be an inductively charged ring design, capable of recharging an internal battery through contact with an inductive charging post. In an alternative embodiment, ring device 106 may be an inductively charged ring design, capable of recharging an internal battery through contact with an inductive charging mat, where the inductive charging mat may be fully integrated, partially integrated, or separate from a cell phone back plate or a track pad of a client device, such as client device 104. In one embodiment, ring device 106 may be made from any suitable ring material, including, but not limited to, metals, plastics, silicon, and carbon fibers, etc., capable of supporting inductive recharging of any internal batteries, and encapsulating (i.e., providing support and structure) any components integrated within ring device 106. In one embodiment, ring device 106 provides the capability for a user to capture writing on any writeable surface, without using a smart device, such as a tablet or smartboard, as the surface does not matter, rather only movement from the user while writing. In one embodiment, ring device 106 provides the capability to transmit a user's hand, arm, wrist, and finger movements to a paired device, such as a client device 104. In one embodiment, ring device 106 may include a band width size between 3 mm and 10 mm. In one embodiment, ring device 106 may include a band thickness between 2 mm and 5 mm. In one embodiment, ring device 106 includes ring program 110 for capturing a user's hand, arm, wrist, and finger movements related to handwriting (e.g., English) or sign language (e.g., American Sign Language).

In one embodiment, ring device 106 may include a fully flexible non-volatile resistive random access memory (RRAM) device for enabling writing, reading and erasing of data within ring device 106. In one embodiment, ring device 106 may include a Bluetooth® module, having dimensions of 3.5 mm or less by 3.5 mm or less, providing the capability to pair (i.e., connect) with one or more client devices, such as client device 104. In one embodiment, ring device 106 may include a six-axis gyroscope and accelerometer, having dimensions of 3 mm or less by 3 mm or less by 0.9 mm or less, for motion tracking, detection, and capture of a user's handwriting movement, where the user's handwriting movement may include, without limitation, hand movements, arm movements, wrist movements, and finger movements within a free space. In one embodiment, ring device 106 may include a flexible battery pack having a plurality of cells in an arrangement allowing for the flexible battery pack to be shaped to fit within the circumference of ring device 106. In one embodiment, ring device 106 may include a charging coil for charging the flexible battery pack, where the charging coil includes wires printed onto a flexible polyimide film, such as the flexible polyimide film used in flexible printed circuits and thermal micrometeoroid garments (i.e., the outside layer of space suits). In one embodiment, ring device 106 may include one or more low power draw light-emitting diodes (LED) to show a remaining charge of ring device 106. For example, a white LED may indicate a 100 percent to 20 percent charge remaining, a blue LED may indicate a less than 20 percent charge remaining, and a red LED may indicate a less than 10 percent charge remaining. In one embodiment, ring device 106 may include one or more vibrational motors for providing haptic feedback in conjunction with line detection to alert a user that a boundary has been crossed in free space.

In one embodiment, ring device 106 may include any type of smart tag capable of utilizing near field communication (NFC) technology embedded with a unique ID, which can be read by a client device, such as client device 104, by coming into a contact range with the smart tag. For example, a user wearing a ring device, such as ring device 106 on a finger, could pick up a smart phone capable of receiving data through NFC, such as client device 104, and simply by bringing the smart phone in a close proximity to a smart tag within the ring device, access a unique ID, or any other relevant information, for purposes of identifying the ring device, establishing a connection to the client device, and transmitting data through an integrated NFC chip.

In one embodiment, ring device 106 may include a conventional wireless access point (WAP) device (not shown) capable of facilitating an exchange of information over radio waves, and establishing a connection (i.e., pairing) between ring device 106 and one or more client devices, such as client device 104. In one embodiment, the WAP may be configured to broadcast a service set identifier (SSID) that incorporates a unique ID for a ring device, such as ring device 106. In one embodiment, the WAP may be searchable by a mobile device having WiFi capability, such as client device 104. In one embodiment, it is not necessary for ring device 106 and a client device, such as client device 104, to be connected over a network in order to broadcast and search for a SSID. In some embodiments, ring device 106 and client device 104 can be interconnected by the WAP. In alternative embodiments, the WAP may include wire cables, wireless communication links, fiber optic cables, routers, switches and/or firewalls. In some embodiments, the WAP can be any combination of connections and protocols capable of supporting communications between ring device 106, client device 104, ring program 110, and stroke extraction program 108. FIG. 1 is intended as an example and not as an architectural limitation for the different embodiments.

Stroke extraction program 108 is a software-based program configured to receive input from a ring device worn by a user, such as ring device 106, and utilizing a training model, digitally transcribe (i.e., output characters via a user interface) what the user has written onto a client device, such as client device 104. In an alternative embodiment, when combined with, for example, augmented reality glasses, stroke extraction program 108 may perform line detection when a user writes in free space over an object or background field of view, such that when the user's writing crosses a line or boundary, stroke extraction program 108 may instruct a ring device worn by the user, such as ring device 106, to initiate haptic feedback, alerting the user that the writing has crossed the line or boundary. For example, in one embodiment, stroke extraction program 108 performs writing recognition in free space to determine, from input captured in a ring device, such as ring device 106, characters written by a user wearing the ring device on their writing hand.

Ring program 110 is a software-based program configured to capture data related to a user's hand, arm, and wrist movements in free space, and transmit the data to a paired device, such as client device 104. In one embodiment, ring program 110 gathers data related to a user's hand, arm, and wrist movements in free space utilizing an integrated accelerometer and gyroscope. In one embodiment, ring program 110 may provide haptic feedback to a user wearing ring device 106 utilizing an integrated accelerometer and gyroscope. In one embodiment, ring program 110 is an agent program to stroke extraction program 108, where ring program 110 may be fully integrated, partially integrated, or separate from stroke extraction program 108. In one embodiment, ring program 110 and stroke extraction program 108 function seamlessly as a single program to perform stroke extraction in free space to transcribe movements into language characters within a digital document.

Figure 2:
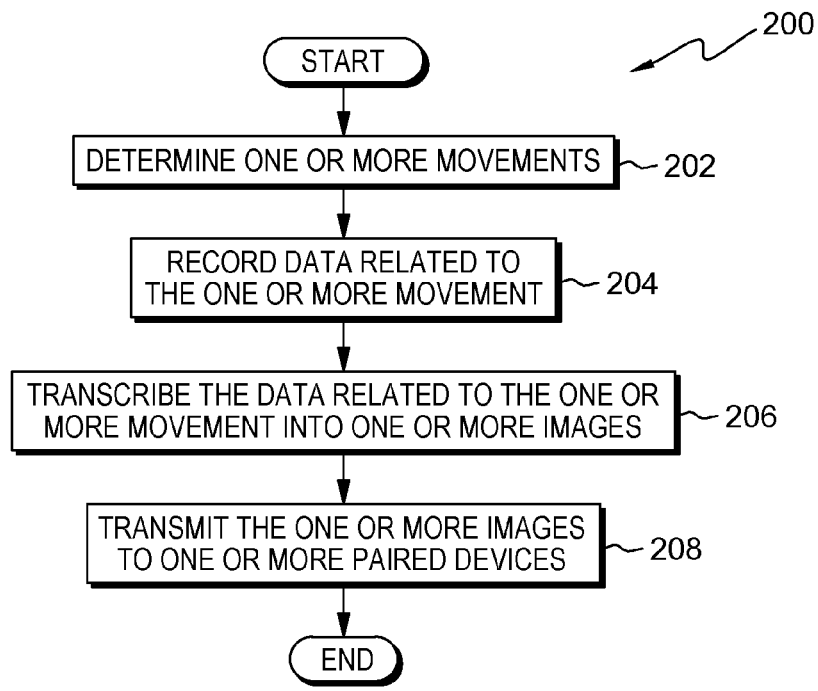
FIG. 2 illustrates a flowchart of an exemplary process flow, generally designated 200, depicting steps of a ring program of a ring device, in accordance with an embodiment of the present invention.

FIG. 2 is a flowchart of an exemplary process flow, generally designated 200, depicting steps of ring program 110 for capturing a user's movement, in accordance with an embodiment of the present invention.

Ring program 110 determines one or more movements (202). In one embodiment, ring program 110 determines one or more movements by monitoring an accelerometer and a gyroscope within a ring device, such as ring device 106. In one embodiment, ring program 110 monitors the accelerometer and the gyroscope for data related to movements in a user's arm, hand, wrist, etc., during handwriting or signing. In one embodiment, data related to the movements may include changes in a magnitude value and a direction value of proper acceleration, i.e., gravitational forces (g-force), of a ring device in free space, such as ring device 106, as a vector quantity, as the movements relate to handwriting strokes or sign language movements. In one embodiment, changes in the magnitude value and the direction value may be used to sense orientation (because direction of weight changes), coordinate acceleration (as long as the coordinate acceleration produces a g-force, or a change in g-force), vibration, and shock, etc. In one embodiment, the data related to the movements may be used to determine an orientation, a position, and a location, a change in the orientation, a change in the position, and a change in the location, of a ring device in free space, such as ring device 106. In one embodiment, the data related to the movement may include data related to measuring orientation of a ring device in free space, such as ring device 106. In one embodiment, responsive to determining a change in proper acceleration, ring program 110 may determine one or more movements for a ring device, such as ring device 106.

Ring program 110 records data related to the one or more movements (204). In one embodiment, responsive to determining one or more movements for a ring device, such as ring device 106, ring program 110 records data related to the one or more movements by saving the data related to the one or more movements on a flexible random access memory integrated within ring device 106. In one embodiment, responsive to determining one or more movements for a ring device, such as ring device 106, ring program 110 records data related to the one or more movements by saving the data related to the one or more movements on a remote storage device.

Ring program 110 transcribes the data related to the one or more movements into one or more images (206). In one embodiment, ring program 110 transcribes the data related to the one or more movements into one or more images, where the one or more images may include a plurality of vector points, a plurality of coordinates, or a plurality of dots interconnected by a plurality of lines, etc. In one embodiment, ring program 110 may transcribe the data related to the one or more movements into images sequentially, such that where ring program 110 determines a movement from left to right after transcribing a first image (such as a movement associated with spacing between letters, words, numbers, symbols, etc.), ring program 110 may begin transcribing a second image sequentially, such that the first and second image may be separate, distinct images, or parts contributing to an image as a whole. In one embodiment, ring program 110 utilizes the data related to the one or more movements, such as values related to proper acceleration, to transcribe the data into the one or more images.

Ring program 110 transmits the one or more images to one or more paired devices (208). In one embodiment, ring program 110 transmits the one or more images to one or more paired devices, such as client device 104. In one embodiment, ring program 110 transmits the one or more images to the one or more paired devices utilizing a wireless communication connection, such as WiFi®, Bluetooth®, etc., for purposes of stroke extraction.

Figure 3:
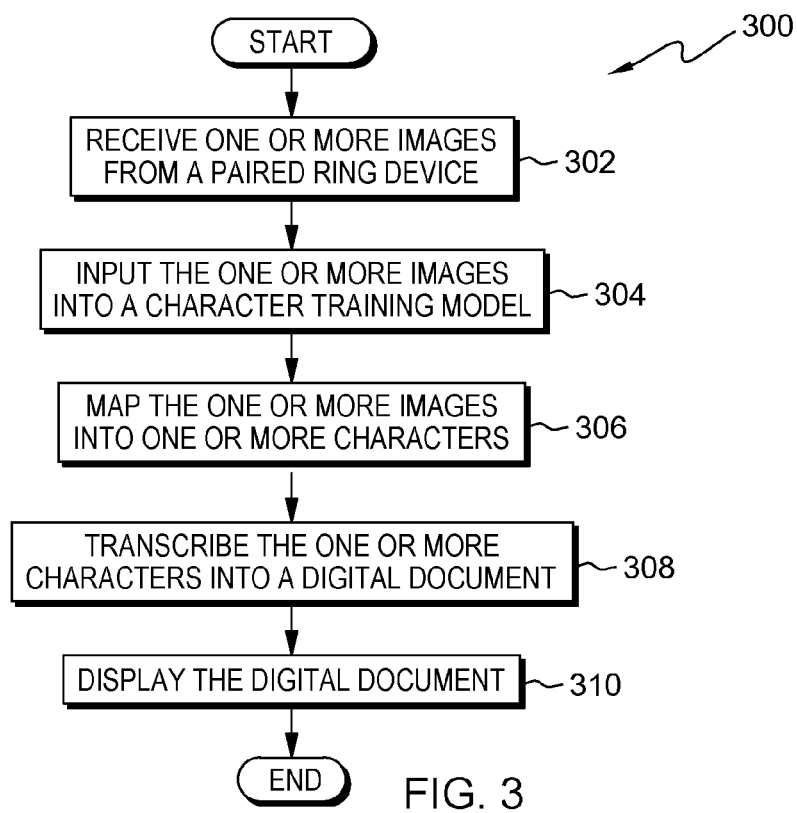
FIG. 3 illustrates a flowchart of an exemplary process flow, generally designated 300, depicting steps of a stroke extraction program, in accordance with an embodiment of the present invention.

FIG. 3 is a flowchart of an exemplary process flow, generally designated 300, depicting steps of stroke extraction program 108 for transcribing a user's movement into digital text, in accordance with an embodiment of the present invention.

Stroke extraction program 108 receives one or more images from a paired ring device (302). In one embodiment, stroke extraction program 108 receives one or more images from a paired ring device, such as ring device 106, where the one or more images includes data related to movement of a user's hand, arm, wrist, etc., captured by a paired ring device, such as ring device 106. In another embodiment, stroke extraction program 108 may receive one or more images from one or more paired ring devices, such as where two or more users may be communication via sign language to one or more non-signing persons.

Stroke extraction program 108 inputs the one or more images into a character training model (304). In one embodiment, stroke extraction program 108 inputs the one or more images into a character training model, wherein the character training model is a character recognition model specifically trained by a user to recognize which movements to map to which characters. In one embodiment, the character training model may be initially trained utilizing a neural network (e.g., neural ocular character recognition (OCR), etc.) known in the art. For example, the character training model may utilize an open-source optical character recognition library fully implemented in a programming language, a bipolar-sigmoid function based neural network with three neural layers, and a feature extraction algorithm utilizing random line receptors. In another embodiment, the character training model may be a character recognition model initially trained utilizing handwritten character recognition (ICR), as various shapes may be more similar to hand written strokes than traces of printed characters. In another embodiment, for recognizing text, the character training model may utilize a recurrent neural network, which is designed to output sequences of characters, and algorithms implemented targeting graphics processing units (GPUs) may dramatically speed up standard algorithms.

Stroke extraction program 108 maps the one or more images into one or more characters (306). In one embodiment, stroke extraction program 108 maps the one or more images into one or more characters based, at least in part, on character recognition results from the character training model. In one embodiment, for example, where the character training model indicates that a first image should be mapped as a character "A", stroke extraction program 108 maps the image as the character "A". In one embodiment, stroke extraction program 108 accumulates the characters (e.g., text) into one or more sentences, paragraphs, keywords, etc., through semantic parsing and sentence construction. In one embodiment, stroke extraction program 108 associates the one or more sentences, paragraphs, keywords, etc., into one or more character streams, and logs the character streams into memory buffers, or transmitted with time stamps or other identifiers to indicate the unique textual representation that is determined to be written language or gesture output derived from the series of strokes in free air.

In one embodiment, stroke extraction program 108 may determine whether the one or more images indicate a written language, a specific character, or a gesture output utilizing a time period of movement of a first image, where upon expiration of the time period of movement, determining that the first image has ended and a second image begins. In another embodiment, stroke extraction program 108 may determine whether the one or more images indicate a written language, a specific character, or a gesture output utilizing a pre-determined range of motion, where the pre-determined range of motion creates a specific image, and as such, indicates a written language, a specific character, or a gesture output. In another embodiment, stroke extraction program 108 may determine whether the one or more images indicate a written language, a specific character, or a gesture output utilizing one or more changes in data recorded on a ring device, such as ring device 106, such as variations in accelerometer data, gyroscope data, location data, orientation data, and position data.

In an embodiment, where stroke extraction program 108 cannot determine, based, at least in part, on the character training model, whether the one or more images indicate a written language, a specific character, or a gesture output, stroke extraction program 108 may determine whether the one or more images exceeds a pre-determined threshold of confidence for character recognition, where the pre-determined threshold of confidence may be a value, a percentage, or a probability that the one or more images indicate one or more characters within the character training model. In one embodiment, where stroke extraction program 108 determines that the one or more images do not exceed a pre-determined threshold of confidence for character recognition, stroke extraction program 108 may prompt a user to manually select a written language, a specific character, or a gesture output that should be indicated by future duplication of the one or more images. In one embodiment, where stroke extraction program 108 determines that the one or more images do not correctly indicate a written language, a specific character, or a gesture output completely, but does exceed a pre-determined threshold of confidence for character recognition, stroke extraction program 108 may substitute a written language, a specific character, or a gesture output most similar to the one or more images.

Stroke extraction program 108 transcribes the one or more characters into a digital document (308). In one embodiment, stroke extraction program 108 transcribes the one or more characters into a digital document, such as a word processing document, for user consumption on a paired client device, such as client device 104. In one embodiment, stroke extraction program 108 may encode the one or more characters into a visual augmentation to be displayed, for example, in a HUD on a paired wearable electronic device, such as augmented reality eyeglasses, through a paired direct connection or intermediate computer system.

Stroke extraction program 108 displays the digital document (310). In one embodiment, stroke extraction program 108 displays the digital document utilizing, for example, an interactive user interface (UI) that may allow a user to view the one or more characters in real time as a paired ring device, such as ring device 106 captures the user's movements with writing or signing in free space. In one embodiment, the UI may allow the user to view the one or more characters utilizing gestures, such as waving next or previous for moving through a presentation deck, or similar presentation system.

Figure 4:
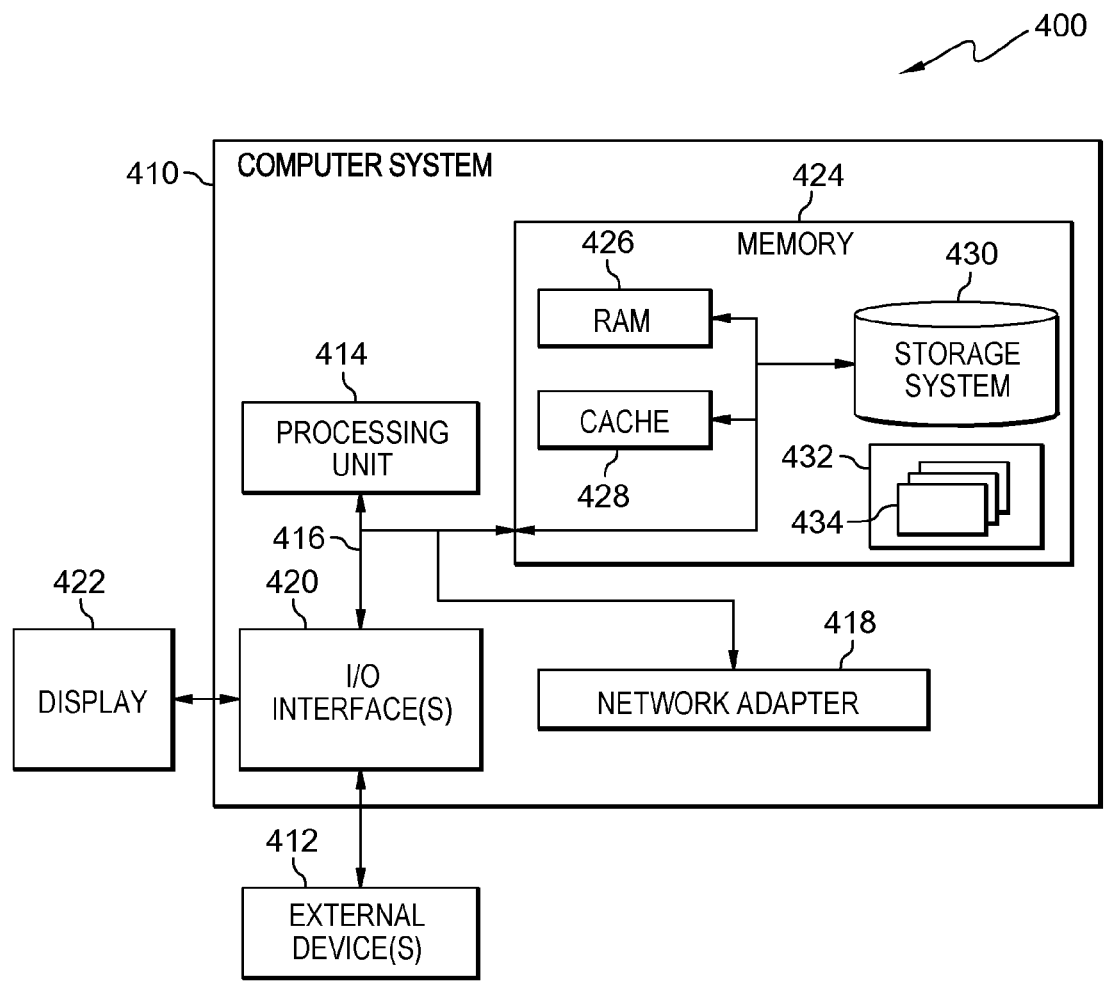
FIG. 4 is a block diagram depicting components of a data processing system (such the client device of FIG. 1), in accordance with an embodiment of the present invention.

FIG. 4 is a block diagram, generally designated 400, depicting components of a data processing system (such as client device 104 of data processing environment 100), in accordance with an embodiment of the present invention. It should be appreciated that FIG. 4 provides only an illustration of one implementation and does not imply any limitations with regard to the environments in that different embodiments can be implemented. Many modifications to the depicted environment can be made.

In the illustrative embodiment, client device 104 in data processing environment 100 is shown in the form of a general-purpose computing device, such as computer system 410. The components of computer system 410 can include, but are not limited to, one or more processors or processing unit(s) 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media can be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 can further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 can include at least one computer program product having a set (e.g., at least one) of program modules that are configured to carry out the functions of embodiments of the invention.

Program/utility 432, having one or more sets of program modules 434, can be stored in memory 424 by way of example, and not limitation, as well as an operating system, one or more application programs, other program modules, and program data. Each of the operating systems, one or more application programs, other program modules, and program data, or some combination thereof, can include an implementation of a networking environment. Program modules 434 generally carry out the functions and/or methodologies of embodiments of the invention as described herein. Computer system 410 can also communicate with one or more external devices 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems can be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction extraction device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for stroke extraction in free space utilizing a paired ring device and a paired display device including a video recording module connected to the paired display device, the method comprising:
    receiving, by one or more computer processors, a video from the video recording module of a free space environment;
    determining, by one or more computer processors, one or more bounded surface areas within the video of the free space environment, with each bounded surface area including at least two dimensions of space;
    displaying, by one or more computer processors, on the paired display device, a modified free space environment including the determined one or more bounded surface areas;
    receiving, by one or more computer processors, one or more images transmitted from the paired ring device, wherein the one or more images are transcribed sequentially from one or more language movements recorded by the paired ring device utilizing a magnitude value and a direction value of proper acceleration of the one or more language movements, and wherein the one or more images include one or more of a plurality of vector points, a plurality of coordinates, and a plurality of dots interconnected by a plurality of lines;
    determining, by one or more processors, at least one of the one or more language movements crossed at least one side of at least one bounded surface area of the one or more bounded surface areas;
    responsive to determining that at least one of the one or more language movements crossed at least one side of at least one bounded surface area of the one or more bounded surface areas, providing, by the one or more processors, haptic feedback to the paired ring device;
    inputting, by one or more computer processors, the one or more images into a character training model;
    mapping, by one or more computer processors, the one or more images into one or more characters in the character training model, wherein mapping includes determining whether the one or more images indicate at least one of the one or more characters in the character training model utilizing a pre-determined range of motion of the paired ring device during a time period of movement in free space, where the pre-determined range of motion creates a specific image; and
    responsive to a determination that the one or more images indicate at least one of the one or more characters in the character training model, transcribing, by one or more computer processors, the at least one of the one or more characters into a digital document, wherein the digital document is a visual augmentation for displaying in a heads up display of the paired display device.

2. The method of claim 1, further comprises:
    wherein the paired ring device includes an accelerometer and a gyroscope for monitoring the one or more language movements; and
    wherein the one or more language movements include a change in a magnitude value and a direction value of proper acceleration of the paired ring device, an orientation of the paired ring device, a position of the paired ring device, a location of the paired ring device, a change in the orientation of the paired ring device, a change in the position of the paired ring device, and a change in the location of the paired ring device, in free space.

3. The method of claim 1, wherein inputting the one or more images into a character training model, further comprises:
    wherein the character training model is a character recognition model specifically trained utilizing a neural network to recognize which of the one or more language movements map to which of the at least one of the one or more characters.

4. The method of claim 3, wherein the character training model is a character recognition model initially trained utilizing handwritten character recognition (ICR).

5. The method of claim 1, wherein determining whether the one or more images indicate at least one of the one or more characters in the character training model, further utilizing one or more changes in data recorded on the paired ring device, further comprises:
    responsive to determining that the one or more images indicate at least one of the one or more characters in the character training model, accumulating, by one or more computer processors, each of the at least one of the one or more characters into one or more character streams, wherein the one or more character streams include at least one of one or more sentences, the at least one of the one or more characters, one or more paragraphs, and one or more keywords; and associating, by one or more computer processors, the one or more character streams, based, at least in part, on character recognition results from the character training model, with a time stamp and identifiers to indicate a textual representation of at least one of the one or more characters in the character training model.

6. The method of claim 1, wherein transcribing the at least one of the one or more characters into a digital document, further comprises:

determining, by one or more computer processors, a representation of the at least one of the one or more characters as a written language or a gesture output derived from a series of strokes in free space; and encoding, by one or more computer processors, the at least one of the one or more characters into a visual augmentation.

7. The method of claim 1, further comprises:

displaying, by one or more computer processors, the digital document on one or more paired devices utilizing an interactive user interface, wherein the interactive user interface provides the capability to view the at least one of the one or more characters in real time.

8. The method of claim 1 wherein the paired ring device is a wearable ring device for a human thumb and/or finger.

9. A computer program product for stroke extraction in free space utilizing a paired ring device and a paired display device including a video recording module connected to the paired display device, the computer program product comprising:

one or more computer readable storage mediums and program instructions stored on the one or more computer readable storage mediums, the program instructions comprising:

program instructions to receive a video from the video recording module of a free space environment, program instructions to determine one or more bounded surface areas within the video of the free space environment, with each bounded surface area including at least two dimensions of space, program instructions to display on the paired display device, a modified free space environment including the determined one or more bounded surface areas, program instructions to receive one or more images transmitted from the paired ring device, wherein the one or more images are transcribed sequentially from one or more language movements recorded by the paired ring device utilizing a magnitude value and a direction value of proper acceleration of the one or more language movements, and wherein the one or more images include one or more of a plurality of vector points, a plurality of coordinates, and a plurality of dots interconnected by a plurality of lines, program instructions to determine, by one or more processors, at least one of the one or more language movements crossed at least one side of at least one bounded surface area of the one or more bounded surface areas, responsive to determining that at least one of the one or more language movements crossed at least one side of at least one bounded surface area of the one or more bounded surface areas, program instructions to provide, by the one or more processors, haptic feedback to the paired ring device, program instructions to input the one or more images into a character training model, program instructions to map the one or more images into one or more characters in the character training model, wherein mapping includes determining whether the one or more images indicate at least one of the one or more characters in the character training model utilizing a pre-determined range of motion of the paired ring device during a time period of movement in free space, where the pre-determined range of motion creates a specific image, and responsive to a determination that the one or more images indicate at least one of the one or more characters in the character training model, program instructions to transcribe the at least one of the one or more characters into a digital document, wherein the digital document is a visual augmentation for displaying in a heads up display of the paired display device.

10. The computer program product of claim 9, further comprises:

wherein the paired ring device includes an accelerometer and a gyroscope for monitoring the one or more language movements; and wherein the one or more language movements includes one or more of a change in a magnitude value and a direction value of proper acceleration of the paired ring device, an orientation of the paired ring device, a position of the paired ring device, a location of the paired ring device, a change in the orientation of the paired ring device, a change in the position of the paired ring device, and a change in the location of the paired ring device, in free space.

11. The computer program product of claim 9, wherein program instructions to input the one or more images into a character training model, further comprises:

wherein the character training model is a character recognition model specifically trained utilizing a neural network to recognize which of the one or more language movements map to which of the at least one of the one or more characters.

12. The computer program product of claim 11, wherein the character training model is a character recognition model initially trained utilizing handwritten character recognition (ICR).

13. The computer program product of claim 9, wherein program instructions to determine whether the one or more images indicate the at least one of the one or more characters in the character training model, further utilizing one or more changes in data recorded on the paired ring device, further comprises:

responsive to determining that the one or more images indicate the at least one of the one or more characters in the character training model, program instructions to accumulate each of the at least one of the one or more characters into one or more character streams, wherein the one or more character streams include at least one of one or more sentences, the at least one of the one or more characters, one or more paragraphs, and one or more keywords; and program instructions to associate the one or more character streams, based, at least in part, on character recognition results from the character training model, with a time stamp and identifiers to indicate a textual representation of the at least one of the one or more characters in the character training model.

14. The computer program product of claim 9, wherein program instructions to transcribe the at least one of the one or more characters into a digital document, further comprises:
- program instructions to determine a representation of the at least one of the one or more characters as a written language or a gesture output derived from a series of strokes in free space; and
- program instructions to encode the at least one of the one or more characters into a visual augmentation.

15. The computer program product of claim 9, further comprises:
- program instructions to display the digital document on one or more paired devices utilizing an interactive user interface, wherein the interactive user interface provides the capability to view the at least one of the one or more characters in real time.

16. The computer program product of claim 9 wherein the paired ring device is a wearable ring device for a human thumb and/or finger.

17. A computer system for stroke extraction in free space utilizing a paired ring device and a paired display device including a video recording module connected to the paired display device, the computer system comprising:
- one or more computer processors;
- one or more computer readable storage mediums;
- program instructions stored on at least one of the one or more computer readable storage mediums for extraction by at least one of the one or more computer processors, the program instructions comprising:
    - program instructions to receive a video from the video recording module of a free space environment,
    - program instructions to determine one or more bounded surface areas within the video of the free space environment, with each bounded surface area including at least two dimensions of space,
    - program instructions to display on the paired display device, a modified free space environment including the determined one or more bounded surface areas,
    - program instructions to receive one or more images transmitted from the paired ring device, wherein the one or more images are transcribed sequentially from one or more language movements recorded by the paired ring device utilizing a magnitude value and a direction value of proper acceleration of the one or more language movements, and wherein the one or more images include one or more of a plurality of vector points, a plurality of coordinates, and a plurality of dots interconnected by a plurality of lines,
    - program instructions to determine, by one or more processors, at least one of the one or more language movements crossed at least one side of at least one bounded surface area of the one or more bounded surface areas,
    - responsive to determining that at least one of the one or more language movements crossed at least one side of at least one bounded surface area of the one or more bounded surface areas, program instructions to provide, by the one or more processors, haptic feedback to the paired ring device,
    - program instructions to input the one or more images into a character training model,
    - program instructions to map the one or more images into one or more characters in the character training model, wherein mapping includes determining whether the one or more images indicate at least one of the one or more characters in the character training model utilizing a pre-determined range of motion of the paired ring device during a time period of movement in free space, where the pre-determined range of motion creates a specific image, and
    - responsive to a determination that the one or more images indicate at least one of the one or more characters in the character training model, program instructions to transcribe the at least one of the one or more characters into a digital document, wherein the digital document is a visual augmentation for displaying in a heads up display of the paired display device.

18. The computer system of claim 17, further comprises:

wherein the paired ring device includes an accelerometer and a gyroscope for monitoring the one or more language movements; and wherein the one or more language movements includes one or more of a change in a magnitude value and a direction value of proper acceleration of the paired ring device, an orientation of the paired ring device, a position of the paired ring device, a location of the paired ring device, a change in the orientation of the paired ring device, a change in the position of the paired ring device, and a change in the location of the paired ring device, in free space.

19. The computer system of claim 17, wherein program instructions to input the one or more images into a character training model, further comprises:
- wherein the character training model is a character recognition model specifically trained utilizing a neural network to recognize which of the one or more language movements map to which of the at least one of the one or more characters.

20. The computer system of claim 19, wherein the character training model is a character recognition model initially trained utilizing handwritten character recognition (ICR).

* * * * *